United States Patent
I

(10) Patent No.: US 9,522,992 B1
(45) Date of Patent: Dec. 20, 2016

(54) POLYPROPYLENE-BASED RESIN COMPOSITION AND MOLDED ARTICLE THEREOF

(71) Applicant: ASAHI KASEI CHEMICALS CORPORATION, Tokyo (JP)

(72) Inventor: Shunichiro I, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 14/809,476

(22) Filed: Jul. 27, 2015

(51) Int. Cl.
  *C08L 53/02* (2006.01)
  *C08L 23/12* (2006.01)
  *C08L 53/00* (2006.01)
  *C08L 71/12* (2006.01)

(52) U.S. Cl.
  CPC .............. *C08L 23/12* (2013.01); *C08L 53/00* (2013.01); *C08L 71/12* (2013.01); *C08L 71/123* (2013.01)

(58) Field of Classification Search
  None
  See application file for complete search history.

(56) References Cited

U.S. PATENT DOCUMENTS

| | | | | |
|---|---|---|---|---|
| 5,891,962 A * | 4/1999 | Otsuzuki et al. | ..... | C08F 287/00 525/316 |
| 2001/0047055 A1* | 11/2001 | Takeuchi et al. | ..... | C08F 297/02 525/88 |
| 2013/0245182 A1* | 9/2013 | Kondo | ..... | C08K 3/20 524/413 |

FOREIGN PATENT DOCUMENTS

| JP | H08-020684 A | 1/1996 |
|---|---|---|
| JP | H08-302107 A | 11/1996 |

* cited by examiner

*Primary Examiner* — Jeffrey Mullis
(74) *Attorney, Agent, or Firm* — Greenblum & Bernstein, P.L.C.

(57) ABSTRACT

The present invention provides a resin composition including: (a): 75 to 97% by mass of a polypropylene-based resin; (b): 1 to 15% by mass of a polyphenylene ether-based resin having a reduced viscosity ($\eta sp/c$: measured as a 0.5 g/dL chloroform solution at 30° C.) of 0.25 to 0.36 dL/g; and (c): 2 to 19% by mass of a hydrogenated block copolymer which is a hydrogenated product of a block copolymer including at least two polymer blocks A mainly including a vinyl aromatic compound and at least one polymer block B mainly including a conjugated diene compound, wherein the polymer block A has a number average molecular weight (MncA) of 4,000 to 8,000 excluding 8,000, and a mass ratio ((b)/(c)) of the component (b) to the component (c) is 10/90 to 60/40.

9 Claims, No Drawings

POLYPROPYLENE-BASED RESIN COMPOSITION AND MOLDED ARTICLE THEREOF

BACKGROUND OF INVENTION

Field of Invention

The present invention relates to a polypropylene-based resin composition and a molded article thereof.

Description of the Related Art

A polypropylene resin composition mainly comprising a polypropylene resin in combination with various rubber components such as an ethylene-α-olefin copolymer has been conventionally widely known.

The polypropylene resin and various rubber components are changed in various ways to thereby achieve improvement in rigidity, impact resistance, and the like.

However, the polypropylene resin composition that has been conventionally known has a bias in physical properties and is not excellent in overall physical properties.

On the other hand, Japanese Patent Laid-Open No. H8-20684 and Japanese Patent Laid-Open No. H8-302107 disclose a resin composition comprising a polypropylene-based polymer, a hydrogenated block copolymer, an ethylene-α-olefin copolymer rubber, and talc as a resin composition that is excellent in rigidity, impact resistance, and moldability.

SUMMARY OF INVENTION

Technical Problem

However, in the resin composition disclosed in Japanese Patent Laid-Open No. H8-20684 and Japanese Patent Laid-Open No. H8-302107, a hydrogenated block copolymer (styrene-ethylene/butylene-styrene copolymer) having a styrene content of 13% by mass is used as a hydrogenated block copolymer, and the composition has not yet provided satisfactory rigidity. Thus, a polypropylene-based resin composition excellent in rigidity and tensile elongation has not yet been obtained.

Further, since a resin composition is often molded after melted by heating in a molding machine, and provided for practical use, the resin composition having excellent residence heat stability which does not result in physical property deterioration by the residence in the molding machine is required.

Therefore, an object of the present invention is to provide a polypropylene-based resin composition excellent in tensile elongation, rigidity, and residence heat stability.

Solution to Problem

As a result of intensive studies to solve the above problems, the present inventor has found that a resin composition comprising a polypropylene-based resin, a polyphenylene ether-based resin having a predetermined reduced viscosity, and a hydrogenated block copolymer having a predetermined structure effectively solves the above problems, and the present invention has been completed based on this finding.

That is, the present invention is as follows.

[1] A resin composition comprising:

(a): 75 to 97% by mass of a polypropylene-based resin;

(b): 1 to 15% by mass of a polyphenylene ether-based resin having a reduced viscosity (ηsp/c: measured as a 0.5 g/dL chloroform solution at 30° C.) of 0.25 to 0.36 dL/g; and (c): 2 to 19% by mass of a hydrogenated block copolymer which is a hydrogenated product of a block copolymer comprising at least two polymer blocks A mainly comprising a vinyl aromatic compound and at least one polymer block B mainly comprising a conjugated diene compound, wherein the polymer block A has a number average molecular weight (MncA) of 4,000 to 8,000 excluding 8,000, and a mass ratio ((b)/(c)) of the component (b) to the component (c) is 10/90 to 60/40.

[2] The resin composition according to the above [1], wherein the mass ratio ((b)/(c)) of the component (b) to the component (c) is 20/80 to 60/40.

[3] The resin composition according to the above [1] or [2], wherein a total amount of conjugated diene compounds bonded by a 1,2-vinyl bond or a 3,4-vinyl bond is 40 to 60 mol % based on all the conjugated diene compounds in the component (c) in the bonding form of the conjugated diene compounds in the polymer block B of the block copolymer before the component (c) is hydrogenated.

[4] The resin composition according to any one of the above [1] to [3], wherein the content of the vinyl aromatic compound in the component (c) is 12 to 30% by mass based on the total amount of the component (c).

[5] The resin composition according to any one of the above [1] to [4], wherein the component (c) has a number average molecular weight (Mnc) of 100,000 or less.

[6] The resin composition according to any one of the above [1] to [5], wherein the component (b) has a number average molecular weight (Mnb) of 7,000 to 15,000.

[7] The resin composition according to any one of the above [1] to [6], wherein the polypropylene-based resin (a) is a homo-polypropylene and/or a block-polypropylene and has a melt flow rate (MFR: measured at 230° C. under a load of 2.16 kg according to ISO 1133) of 0.1 to 100 g/10 minutes.

[8] The resin composition according to any one of the above [2], wherein the polypropylene-based resin (a) is a homo-polypropylene and/or a block-polypropylene and has a melt flow rate (MFR: measured at 230° C. under a load of 2.16 kg according to ISO 1133) of 0.1 to 100 g/10 minutes.

[9] A molded article comprising the resin composition according to any one of the above [1] to [8].

Advantageous Effects of Invention

The present invention provides a resin composition excellent in tensile elongation, rigidity, and residence heat stability.

DESCRIPTION OF EMBODIMENT

Hereinafter, an embodiment for carrying out the present invention (hereinafter referred to as "the present embodiment") will be described in detail. The present embodiment to be described below is for illustration purposes to describe the present invention and not intended to limit the present invention to the following contents. The present invention can be implemented by suitably modifying the contents within the scope of the present invention.

[Resin Composition]

The resin composition of the present embodiment is a resin composition comprising:

(a): 75 to 97% by mass of a polypropylene-based resin;

(b): 1 to 15% by mass of a polyphenylene ether-based resin having a reduced viscosity (ηsp/c: measured as a 0.5 g/dL chloroform solution at 30° C.) of 0.25 to 0.36 dL/g; and (c): 2 to 19% by mass of a hydrogenated block copolymer which is a hydrogenated product of a block copolymer comprising at least two polymer blocks A mainly comprising a vinyl aromatic compound and at least one polymer block B mainly comprising a conjugated diene compound, wherein the polymer block A has a number average molecular weight (MncA) of 4,000 to 8,000 excluding 8,000, and a mass ratio ((b)/(c)) of the component (b) to the component (c) is 10/90 to 60/40.

Each component which forms the resin composition of the present embodiment will be described.

(Polypropylene-Based Resin (a))

Examples of the polypropylene-based resin (a) which forms the resin composition of the present embodiment include, but are not particularly limited to, a crystalline propylene homopolymer and a crystalline propylene-ethylene block copolymer having a crystalline propylene homopolymer part obtained in the first step of polymerization and a propylene-ethylene random copolymer part obtained by copolymerizing propylene, ethylene, and/or at least one different α-olefin (such as butene-1 and hexene-1) in the second step of polymerization or later.

Further, the polypropylene-based resin (a) may be a mixture of the crystalline propylene homopolymer and the crystalline propylene-ethylene block copolymer.

These polypropylene-based resins may be used singly or in combination of two or more.

Examples of the methods for producing the polypropylene-based resin (a) include, but are not particularly limited to, a method of polymerizing a monomer in the presence of e.g. a titanium trichloride catalyst or a titanium halide catalyst supported by a carrier such as magnesium chloride and an alkylaluminum compound at a polymerization temperature in the range of 0 to 100° C. at a polymerization pressure in the range of 3 to 100 atm.

At this time, it is also possible to add a chain transfer agent such as hydrogen in order to adjust the molecular weight of the polymer.

Further, any of a batch method and a continuous method can be employed as the polymerization method, and examples thereof include solution polymerization in a solvent such as butane, pentane, hexane, heptane, and octane, slurry polymerization, mass polymerization in a monomer without a solvent, and gas phase polymerization in a gaseous monomer.

Furthermore, in order to increase the isotacticity of the resulting polypropylene and polymerization activity, an electron donative compound can be used as an internal donor component or an external donor component in addition to the polymerization catalyst or the polymerization monomers.

A known compound can be used as these electron donative compounds, and examples thereof include, but are not limited to, ester compounds such as ε-caprolactone, methyl methacrylate, ethyl benzoate, and methyl toluate; phosphites such as triphenyl phosphite and tributyl phosphite; phosphoric acid derivatives such as hexamethylphosphoric triamide; alkoxy ester compounds, aromatic monocarboxylic acid esters and/or aromatic alkyl alkoxy silanes, aliphatic hydrocarbon alkoxysilanes, various ether compounds, various alcohols and/or various phenols.

The polypropylene-based resin (a) has a melt flow rate (at 230° C. under a load of 2.16 kg according to ISO 1133) of preferably in the range of 0.1 to 100 g/10 minutes, more preferably in the range of 0.1 to 80 g/10 minutes.

By setting the MFR to the above range, the balance between fluidity and rigidity tends to be improved.

The MFR can be measured by the method described in Examples to be described below.

A conventionally known method can be applied to the method for polymerizing the polypropylene-based resin (a), and examples thereof include, but are not limited to, transition metal catalyzed polymerization, radical polymerization, and ionic polymerization.

In addition to the various polypropylene-based resins described above, the polypropylene-based resin (a) may be a modified polypropylene-based resin (in which 0.01 to 10% by mass of α,β-unsaturated carboxylic acid or a derivative thereof is grafted or added) obtained by allowing the polypropylene-based resin to react with the α,β-unsaturated carboxylic acid or a derivative thereof at a temperature of 30 to 350° C. in a molten state or a solution state in the presence or absence of a radical generator, or may be a mixture of the polypropylene-based resin described above and the modified polypropylene-based resin at an arbitrary ratio.

The mixing ratio of the polypropylene-based resin and the modified polypropylene-based resin is not limited, but can be arbitrarily determined.

(Polyphenylene Ether-Based Resin (b))

The polyphenylene ether-based resin (b) (hereinafter may be described as "component (b)" or "PPE") contained in the resin composition of the present embodiment is preferably a homopolymer or a copolymer having a repeating unit structure represented by following general formula (1).

The component (b) has a reduced viscosity (ηsp/c: measured as a 0.5 g/dL chloroform solution at 30° C.) in the range of 0.25 to 0.36 dL/g, preferably in the range of 0.28 to 0.35 dL/g, more preferably 0.30 to 0.35 dL/g.

[Formula 1]

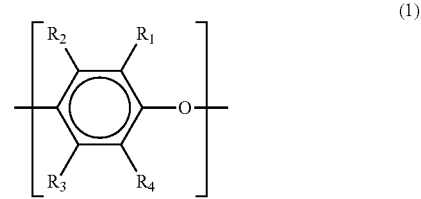

(1)

In the above formula (1), $R_1$, $R_2$, $R_3$, and $R_4$ are each independently any one selected from the group consisting of a hydrogen atom, a halogen atom, a primary or secondary alkyl group having 1 to 7 carbon atoms, a phenyl group, a haloalkyl group, an aminoalkyl group, a hydrocarbon oxy group, and a halohydrocarbon oxy group in which at least two carbon atoms keep a halogen atom and an oxygen atom separated.

When the polyphenylene ether-based resin (b) is a copolymer, a plurality of monomers among the monomers that satisfy above formula (1) are preferably used in combination.

The Polyphenylene ether-based resin (b) is not particularly limited, but a known resin can be used.

Examples thereof include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether). Further, polyphenylene ether copolymers of 2,6-dimethylphenol and other phenols (for example, 2,3,6-trimethylphenol and 2-methyl-6-butylphenol) and the like can also be used.

Among them, poly(2,6-dimethyl-1,4-phenylene ether), a copolymer of 2,6-dimethylphenol and 2,3,6-trimethylphenol are preferred, and poly(2,6-dimethyl-1,4-phenylene ether) is more preferred.

A method for producing the polyphenylene ether-based resin (b) is not particularly limited, but a conventionally known method can be applied.

For example, the polyphenylene ether-based resin (b) can be easily produced by subjecting 2,6-xylenol to oxidation polymerization using a complex of a cuprous salt and an amine described in U.S. Pat. No. 3,306,874 as a catalyst. Alternatively, the polyphenylene ether-based resin (b) can be produced by the methods described in U.S. Pat. No. 3,306,875, U.S. Pat. No. 3,257,357, U.S. Pat. No. 3,257,358, Japanese Patent Publication No. 52-17880, Japanese Patent Laid-Open No. 50-51197, and Japanese Patent Laid-Open No. 63-152628.

The number average molecular weight of the polyphenylene ether-based resin (b) is preferably in the range of 7000 to 15000 as will be described below and can be controlled by adjusting polymerization time, the amount of a catalyst to be used, the amount of monomers, solvent composition, and the like.

The resin composition of the present embodiment contains a polyphenylene ether-based resin having a reduced viscosity ($\eta sp/c$: measured as a 0.5 g/dL chloroform solution at 30° C.) of 0.25 to 0.36 dL/g as the polyphenylene ether-based resin (b). The reduced viscosity of the component (b) can be controlled by adjusting polymerization time, the amount of a catalyst to be used, the amount of monomers, solvent composition, and the like.

Further, a modified polyphenylene ether-based resin in which a styrenic monomer or a derivative thereof is grafted onto or added to the above polyphenylene ether-based resin may be used in combination as the polyphenylene ether-based resin (b). The modified polyphenylene ether-based resin is obtained, for example, by a method of allowing the above polyphenylene ether-based resin to react with a styrenic monomer or a derivative thereof at 80 to 350° C. in a molten state, a solution state, or a slurry state in the presence or absence of a radical generator, but the production of the modified polyphenylene ether-based resin is not limited to this method.

Examples of the modified polyphenylene ether-based resin include, but are not limited to, a polyphenylene ether-based resin in which a styrenic monomer or a derivative thereof is grafted or added in an amount of 0.01 to 10% by mass.

The mixing ratio of the modified polyphenylene ether-based resin to the polyphenylene ether-based resin is not limited, but these resins can be mixed at an arbitrary ratio.

Further, a mixture obtained by mixing polystyrene, syndiotactic polystyrene, or high impact polystyrene with the polyphenylene ether resin described above can be suitably used as the polyphenylene ether-based resin (b).

The mixture is more suitably a mixture obtained by mixing polystyrene, syndiotactic polystyrene, or high impact polystyrene in an amount in the range of 400 parts by mass or less based on 100 parts by mass of the polyphenylene ether-based resin described above.

The polyphenylene ether-based resin (b) preferably has a number average molecular weight (Mnb) of 7,000 to 15,000.

This provides the effect that the compatibility with component (c) to be described below can be increased.

The number average molecular weight of the component (b) is more preferably 8000 to 14000, further preferably 9000 to 13000.

(Hydrogenated Block Copolymer (c))

The Hydrogenated block copolymer (c) is obtained by hydrogenating at least part of a block copolymer comprising at least two polymer blocks A mainly comprising a vinyl aromatic compound and at least one polymer block B mainly comprising a conjugated diene compound.

The number average molecular weight (Mnc) of the hydrogenated block copolymer (c) is preferably 100,000 or less, more preferably 90000 or less, further preferably 80000 or less, from the viewpoint that in the melt-mixing with the component (a), a preferred diffusion can be achieved in the system.

The number average molecular weight (Mnc) of the component (c) can be measured by using gel permeation chromatography System 21 (column: one K-G, one K-800RL, and one K-800R, all manufactured by Showa Denko K.K., are connected in this order in series, column temperature: 40° C., solvent: chloroform, solvent flow rate: 10 ml/min, sample concentration: 1 g/liter chloroform solution of the hydrogenated block copolymer) manufactured by Showa Denko K.K. and preparing a calibration curve using standard polystyrenes (the molecular weights of standard polystyrenes are U.S. Pat. Nos. 3,650,000, 2,170,000, 1,090,000, 681000, 204000, 52000, 30200, 13800, 3360, 1300, and 550).

The wavelength of UV (ultraviolet rays) for a detecting element is preferably set to 254 nm for both the standard polystyrenes and the hydrogenated block copolymer.

Note that the number average molecular weight of the component (c) can be controlled by adjusting the amount of a catalyst in a polymerization step.

The number average molecular weight (MncA) of the polymer block A is 4,000 to 8,000 excluding 8,000.

The number average molecular weight (MncA) is preferably less than 7000, more preferably less than 6000.

When the number average molecular weight of the polymer block A is 4000 to 8000 excluding 8,000, the component (c) can be compatible with the component (b), and the resulting resin composition can have superior tensile elongation.

The number average molecular weight (MncA) of the polymer block A mainly comprising a vinyl aromatic compound of the hydrogenated block copolymer (c) can be determined, for example in the case of an A-B-A type structure, by the calculation formula: (MncA)=(Mnc)×1/2 (the ratio of the amount of bonded vinyl aromatic compound), based on the number average molecular weight (Mnc) of the above hydrogenated block copolymer (c), provided that the molecular weight distribution of the hydrogenated block copolymer is 1, and the two polymer blocks A each mainly comprising a vinyl aromatic compound are present as having the same molecular weight.

Similarly, in the case of an A-B-A-B-A type hydrogenated block copolymer, the number average molecular weight (MncA) of the polymer block A can be determined by the calculation formula: (MncA)=(Mnc)×1/3 (the ratio of the amount of bonded vinyl aromatic compound).

Note that when the sequence of the above-described block structure A and block structure B is clear in the stage of synthesizing a vinyl aromatic compound-conjugated diene block copolymer, the number average molecular weight (MncA) of the polymer block A may be calculated from the ratio of the block structure A based on the number average molecular weight (Mnc) of the hydrogenated block copolymer measured, without being dependent on the above calculation formulas.

<Polymer Block a Mainly Comprising a Vinyl Aromatic Compound>

The Polymer block A mainly comprising a vinyl aromatic compound is a homopolymer block of a vinyl aromatic compound or a copolymer block of a vinyl aromatic compound and a conjugated diene compound.

In the polymer block A, "mainly comprising a vinyl aromatic compound" means that the polymer block A comprises more than 50% by mass of a vinyl aromatic compound, preferably 70% by mass or more of a vinyl aromatic compound.

Examples of the vinyl aromatic compound that forms the polymer block A include, but are not limited to, styrene, α-methylstyrene, vinyltoluene, p-tert-butylstyrene, and diphenylethylene. These may be used singly or in combination of two or more. Styrene is preferred among the above.

<Content of the Vinyl Aromatic Compound in the Component (c)>

The content of the vinyl aromatic compound bonded in the component (c) is preferably 12 to 30% by mass, more preferably 12 to 25% by mass, further preferably 15 to 23% by mass based on a total amount of the component (c).

The content of the vinyl aromatic compound in the component (c) means the amount of the vinyl aromatic hydrocarbon compound bonded in a hydrogenated block copolymer when the hydrogenated block copolymer is singly used as the component (c).

In the resin composition of the present embodiment, the component (c) may be used singly or in combination of two or more, and when two or more hydrogenated block copolymers are used as the component (c), the content of the vinyl aromatic compound means the weight average amount of the vinyl aromatic hydrocarbon compound bonded in each hydrogenated block copolymer.

For example, when 3 parts of a hydrogenated block copolymer containing 60% by mass of a vinyl aromatic compound and 7 parts of a hydrogenated block copolymer containing 15% by mass of a vinyl aromatic compound are used in combination, the weight average amount of the vinyl aromatic hydrocarbon compound bonded in the hydrogenated block copolymer (c) will be 0.3×60+0.7×15=28.5% by mass.

When the content of the vinyl aromatic compound in the component (c) is within the above range, the resulting resin composition will have improved tensile elongation and satisfactory low-temperature embrittlement temperature that is not excessively high.

The content of the vinyl aromatic compound in the component (c) can be measured by a nuclear magnetic resonance apparatus (NMR), ultraviolet spectrophotometer (UV), and the like. Specifically, the content can be measured by the method described in Examples to be described below.

Note that the content of the vinyl aromatic compound in the component (c) can be controlled by adjusting the mass, the mass ratio, the polymerization reactivity ratio, and the like of the vinyl aromatic compound and conjugated diene.

<Polymer Block B Mainly Comprising a Conjugated Diene Compound>

The polymer block B mainly comprising a conjugated diene compound is a homopolymer block of a conjugated diene compound or a random copolymer block of a conjugated diene compound and a vinyl aromatic compound.

In the polymer block B, "mainly comprising a conjugated diene compound" means that the polymer block B comprises more than 50% by mass of a conjugated diene compound, preferably 70% by mass or more of a conjugated diene compound.

Examples of the conjugated diene compound that forms the polymer block B include, but are not limited to, butadiene, isoprene, 1,3-pentadiene, and 2,3-dimethyl-1,3-butadiene. These may be used singly or in combination of two or more. Butadiene, isoprene, and a combination thereof are preferred among the above.

<Total Vinyl Bond Amount>

In the bonding form of the conjugated diene compound, for example butadiene monomer unit, in the polymer block B before the component (c) is hydrogenated, the microstructure in the block B can be arbitrarily selected.

That is, the total amount of the conjugated diene compounds bonded by the 1,2-vinyl bond or the 3,4-vinyl bond (total vinyl bond amount) is preferably 40 to 60 mol %, more preferably 45 to 55 mol %, based on all the conjugated diene compounds in the component (c). When the total amount of the conjugated diene compounds bonded by the 1,2-vinyl bond or the 3,4-vinyl bond is within the above range, the dispersion of the component (c) will be satisfactory, and the resulting resin composition will be excellent in tensile elongation and deflection temperature under load.

The total vinyl bond amount in the component (c) can be controlled by adding a 1,2-bond amount regulator or by adjusting polymerization temperature.

The at least one polymer block B mainly comprising a conjugated diene compound may be a single polymer block in which the total amount of the conjugated diene compounds bonded by the 1,2-vinyl bond or the 3,4-vinyl bond (total vinyl bond amount) in the conjugated diene compounds before hydrogenation is 40 to 60 mol %, or may be a polymer block B mainly comprising a conjugated diene compound having, in combination, at least one polymer block B1 mainly comprising a conjugated diene compound in which the total vinyl bond amount is 40 to 60 mol % and at least one polymer block B2 mainly comprising a conjugated diene compound in which the total vinyl bond amount is 30 to 40 mol % excluding 40 mol %.

The block copolymer having such a block structure, which is represented, for example, by A-B2-B1-A, can be obtained by a known polymerization method in which the 1,2-vinyl bond amount or the 3,4-vinyl bond amount is controlled based on the feed sequence of each monomer unit adjusted.

The bonding form and total vinyl bond amount of the conjugated diene compound before hydrogenation can be known by infrared spectrophotometer, NMR, and the like, and can be specifically measured by the method described in Examples to be described below.

<Block Structure of the Component (c)>

When the polymer block A is represented by "A" and the polymer block B is represented by "B", examples of the component (c) include a hydrogenated product of a vinyl aromatic-conjugated diene compound block copolymer having a structure in which the block units are bonded, such as an A-B-A type, an A-B-A-B type, a B-A-B-A type, an (A-B-)$_n$-X type (wherein n represents an integer of 2 or more, and X represents a reactive residue of a polyfunctional coupling agent such as silicon tetrachloride and tin tetrachloride or a residue of an initiator such as a polyfunctional organolithium compound), and an A-B-A-B-A type.

Especially, a hydrogenated block copolymer having an A-B-A-B type structure or a B-A-B-A type structure is more preferred because it is excellent in fluidity.

Examples of the molecular structure of the block copolymer comprising the polymer block A and the polymer block B may include, but are not particularly limited to, linear, branched, radial, and an arbitrary combination thereof.

In the polymer block A and the polymer block B, the distribution of the vinyl aromatic compound or the conjugated diene compound in the molecular chain in each polymer block may be random, tapered (a monomer component increasing or decreasing along the molecular chain), partly in a block form, or an arbitrary combination thereof.

When either the polymer block A or the polymer block B is present in an amount of two or more in a repeating unit, each polymer block may have the same structure or may have a different structure.

<Degree of Hydrogenation of the Conjugated Diene Compound in the Component (c)>

Further, the degree of hydrogenation of the conjugated diene compound in the component (c) is, but not particularly limited to, preferably 50% or more, more preferably 80% or more, further preferably 90% or more, of the double bonds derived from the conjugated diene compound.

The degree of hydrogenation can be measured by NMR, and can be specifically measured by the method described in Examples to be described below.

<Hydrogenated Block Copolymer (c)>

A method for producing a hydrogenated block copolymer (c) is not particularly limited, but a known production method can be applied.

Examples of the known production method include the methods described in Japanese Patent Laid-Open No. 47-11486, Japanese Patent Laid-Open No. 49-66743, Japanese Patent Laid-Open No. 50-75651, Japanese Patent Laid-Open No. 54-126255, Japanese Patent Laid-Open No. 56-10542, Japanese Patent Laid-Open No. 56-62847, Japanese Patent Laid-Open No. 56-100840, Japanese Patent Laid-Open No. 2-300218, UK Patent No. 1130770, U.S. Pat. No. 3,281,383, U.S. Pat. No. 3,639,517, UK Patent No. 1020720, U.S. Pat. No. 3,333,024, and U.S. Pat. No. 4,501,857.

The hydrogenated block copolymer (c) may be a modified hydrogenated block copolymer obtained by allowing a hydrogenated block copolymer to react with an $\alpha,\beta$-unsaturated carboxylic acid or a derivative thereof (an ester compound and an acid anhydride compound) at 80 to 350° C. in a molten state, a solution state, or a slurry state in the presence or absence of a radical generator. In this case, the $\alpha,\beta$-unsaturated carboxylic acid or a derivative thereof is preferably grafted or added to the hydrogenated block copolymer at a ratio of 0.01 to 10% by mass. Further, the hydrogenated block copolymer (c) may be a mixture of the above hydrogenated block copolymer and the modified hydrogenated block copolymer at an arbitrary ratio.

(Amount of Components Blended)

The resin composition of the present embodiment comprises the component (a) to the component (c) described above as fundamental components.

In the resin composition of the present embodiment, the content of the component (a) is 75 to 97% by mass, preferably 80 to 95% by mass, more preferably 83 to 90% by mass.

A resin composition excellent in rigidity can be obtained by setting the content of the component (a) to the above range.

The content of the component (b) is 1 to 15% by mass, preferably 2 to 12% by mass, more preferably 3 to 11% by mass. A resin composition excellent in rigidity can be obtained by setting the content of the component (b) to the above range.

The content of the component (c) is 2 to 19% by mass, preferably 4 to 18% by mass, more preferably 5 to 17% by mass. A resin composition excellent in tensile elongation can be obtained by setting the content of the component (c) to the above range.

Further, the mass ratio ((b)/(c)) of the component (b) to the component (c) is 10/90 to 60/40, preferably 20/80 to 60/40, more preferably 20/80 to 50/50. By setting the mass ratio to the above range, the compatibility of the component (b) with the component (c) is improved, resulting in a resin composition excellent in tensile elongation and more excellent in residence heat stability.

(Other Components)

In the resin composition of the present embodiment, other additional components may be added as needed in the range that does not impair the feature and effect of the present invention in addition to the component (a) to the component (c) described above.

Examples of other additional components include, but are not particularly limited to, a block copolymer of a vinyl aromatic compound-a conjugated diene compound, an olefinic elastomer, an antioxidant, a metal deactivator, a heat stabilizer, a flame retardant (such as an organophosphate-based compound, an ammonium polyphosphate-based compound, a polyphosphoric acid-melamine-based compound, phosphinates, magnesium hydroxide, an aromatic halogen-based flame retardant, a silicone-based flame retardant, and zinc borate), a fluorine-based polymer, a plasticizer (such as low molecular weight polyethylene, epoxidized soybean oil, polyethylene glycol, and a fatty acid ester), a flame retardant auxiliary such as antimony trioxide, a weather (light) resistance improving agent, a nucleating agent for polyolefin, a slipping agent, an inorganic or organic filler or reinforcing material (such as GF (glass fiber), GF filament, CF (carbon fiber), CF filament, polyacrylonitrile fiber, carbon black, titanium oxide, calcium carbonate, talc, mica, Wollastonite, kaolin, conductive metal fiber, and conductive carbon black), various coloring agents, and a release agent.

[Method for Producing Resin Composition]

A method for producing the resin composition of the present embodiment will be described.

Although the resin composition of the present embodiment can be produced using various melt-kneaders and kneading extruders, the production method preferably includes following steps (1-1) and (1-2) or steps (2-1) and (2-2).

Step (1-1): The step of melt kneading the total amount of the component (a) or part of the component (a).

Step (1-2): The step of melt kneading the component (b), the component (c), and the balance of the component (a) (excluding the case where the total amount of the component (a) has been used in step (1-1)) with the melt-kneaded product in step (1-1).

Step (2-1): The step of melt kneading component (b) and the component (c).

Step (2-2): The step of melt kneading the component (a) with the kneaded product obtained in step (2-1).

When the component (a) to the component (c) are melt kneaded, the component (b) and the component (c) are preferably added at the same position. This is because if the component (c) is added to the component (a) before adding the component (b), the component (c) will diffuse in the component (a) very fast, and even when component (b) is added later, the contact time between the component (b) and the component (c) will be too short to be sufficiently compatible with each other, resulting in the component (b) being dispersed singly in the component (a).

As long as the above production method is satisfied, a masterbatch in which the component (b) and the component (c) are previously mixed may be used for the melt kneading.

The melt-kneader used for the method for producing the resin composition described above is not particularly limited, but a known kneader can be used. Examples thereof include heat melting kneaders such as a single screw extruder, a multi-screw extruder including a twin screw extruder, a roll, a kneader, a Brabender plastograph, and a Banbury mixer. In particular, a melt-kneading method using a twin screw extruder is preferred.

Specific examples include the ZSK series manufactured by Coperion GmbH, the TEM series manufactured by Toshiba Machine Co., Ltd., and the TEX series manufactured by Japan Steel Works, Ltd.

The L/D (barrel effective length/barrel bore) of the extruder is preferably in the range of 20 or more and 75 or less, more preferably in the range of 30 or more and 60 or less.

Examples of preferred extruders include an extruder in which there are provided, in the flow direction of raw materials, a first raw material feed port on the upstream side, a first vacuum vent downstream of the first raw material feed port, a second raw material feed port downstream of the first vacuum vent, and a second vacuum vent downstream of the second raw material feed port, and an extruder in which there are provided, in the flow direction of raw materials, a first raw material feed port on the upstream side, a first vacuum vent downstream of the first raw material feed port, a second and third raw material feed ports downstream of the first vacuum vent, and a second vacuum vent downstream of the third raw material feed port.

Examples of more preferred extruders among the above include an extruder in which there are provided a kneading section upstream of the first vacuum vent, a kneading section between the first vacuum vent and the second raw material feed port, and a kneading section between the second raw material feed port and the second vacuum vent, and an extruder in which there are provided a kneading section upstream of the first vacuum vent, a kneading section between the first vacuum vent and the second raw material feed port, a kneading section between the second raw material feed port and the third raw material feed port, and a kneading section between the third raw material feed port and the second vacuum vent.

Further, the method for feeding raw materials to the second and third raw material feed ports is not particularly limited, but the feed of raw materials using a forced side feeder from the openings on the extruder side is more stable and preferred than the feed by simply adding raw materials from the openings at the second and third raw material feed ports of the extruder.

Melt kneading temperature and screw rotation speed are not particularly limited, but generally, the melt kneading temperature is set to 200 to 370° C., and the screw rotation speed is set to 100 to 1200 rpm.

[Molded Article Using Resin Composition]

The resin composition of the present embodiment can be molded into a molded article of various parts by various known methods, for example, injection molding, extrusion molding (a sheet and a film), and blow molding.

Examples of these various parts include automobile parts, and specific examples thereof in which the resin composition of the present embodiment is suitable include exterior parts such as a bumper, a fender, a door panel, a molding, an emblem, an engine hood, a wheel cover, a roof, and a spoiler, and interior parts such as an instrument panel and a console box trim. Further examples of the parts in which the resin composition of the present embodiment can also be used include a cabinet and a chassis of various computers and peripheral devices thereof, other OA equipment, a television, a video, and various disk players, a refrigerator, an air-conditioner, and a liquid crystal projector. Furthermore, examples of the parts in which the resin composition of the present embodiment is suitable include parts requiring high hinge characteristics.

EXAMPLES

Hereinafter, the present embodiment will be described in detail with reference to specific Examples and Comparative Examples, but the present embodiment is not limited to the following Examples.

Methods for measuring physical properties of each material will be described below.

(MFR (Melt Flow Rate))

The MFR of the following polypropylene resin was measured at 230° C. under a load of 2.16 kg according to ISO 1133.

(Measurement of the Amount of Bonded Styrene)

The amount of bonded styrene of the following hydrogenated block copolymers was measured with an ultraviolet spectrophotometer (UV).

(Measurement of the Degree of Hydrogenation)

The degree of hydrogenation of the following hydrogenated block copolymers was measured by NMR.

(Measurement of Total Vinyl Bond Amount)

The total vinyl bond amount of the following hydrogenated block copolymers before hydrogenation was measured with an infrared spectrophotometer.

[Materials of Resin Composition]

(Component (a) Polypropylene Resin)

Propylene homopolymer MFR: 6 g/10 minutes, density: 0.90 g/cm$^3$ (Component (b) Polyphenylene Ether)

(b-1): Polyphenylene ether having a reduced viscosity of 0.33 dL/g obtained by oxidation polymerization of 2,6-xylenol (b-2): Polyphenylene ether having a reduced viscosity of 0.41 dL/g obtained by oxidation polymerization of 2,6-xylenol (b-3): Polyphenylene ether having a reduced viscosity of 0.51 dL/g obtained by oxidation polymerization of 2,6-xylenol The reduced viscosity was measured as a 0.5 g/dL chloroform solution at 30° C. using an Ubbelohde viscometer.

(Component (c) Hydrogenated Block Copolymer)

(c-1): A block copolymer having an A-B-A-B type structure of polystyrene (1)-hydrogenated polybutadiene-polystyrene (2)-hydrogenated polybutadiene A block copolymer before hydrogenation of the block copolymer having the above structure was synthesized by a conventional method.

The synthesized block copolymer was hydrogenated by a conventional method to obtain a hydrogenated block copolymer.

The characteristics of the hydrogenated block copolymer obtained will be described below.

The amount of bonded styrene: 17% by mass

The total amount of the 1,2-vinyl bond amount and the 3,4-vinyl bond amount (total vinyl bond amount) of polybutadiene before hydrogenation: 50%

The degree of hydrogenation of the polybutadiene part: 99.9%

The number average molecular weight (Mn) of the hydrogenated block copolymer: 65,000

The number average molecular weight of the polystyrene part (1): 5500

The number average molecular weight of the polystyrene part (2): 5500

(c-2): A hydrogenated block copolymer having an A-B-A type structure of polystyrene (1)-hydrogenated polybutadiene-polystyrene (2)

A block copolymer before hydrogenation of the block copolymer having the above structure was synthesized by a conventional method.

The synthesized block copolymer was hydrogenated by a conventional method to obtain a hydrogenated block copolymer.

The characteristics of the hydrogenated block copolymer obtained will be described below.

The amount of bonded styrene: 20%

The total amount of the 1,2-vinyl bond amount and the 3,4-vinyl bond amount (total vinyl bond amount) of polybutadiene before hydrogenation: 35%

The degree of hydrogenation of the polybutadiene part: 99.9%

The number average molecular weight of the hydrogenated block copolymer: 60000

The number average molecular weight of the polystyrene (1): 6000

The number average molecular weight of the polystyrene (2): 6000

(c-3): A block copolymer having an A-B-A-B type structure of polystyrene (1)-hydrogenated polybutadiene-polystyrene (2)-hydrogenated polybutadiene A block copolymer before hydrogenation of the block copolymer having the above structure was synthesized by a conventional method.

The synthesized block copolymer was hydrogenated by a conventional method to obtain a hydrogenated block copolymer.

The characteristics of the hydrogenated block copolymer obtained will be described below.

The amount of bonded styrene: 43% by mass

The total amount of the 1,2-vinyl bond amount and the 3,4-vinyl bond amount (total vinyl bond amount) of polybutadiene before hydrogenation: 75%

The degree of hydrogenation of the polybutadiene part: 99.9%

The number average molecular weight (Mn) of the hydrogenated block copolymer: 95,000

The number average molecular weight of the polystyrene part (1): 20400

The number average molecular weight of the polystyrene part (2): 20450

(c-4): A hydrogenated block copolymer having an A-B-A-B type structure of polystyrene (1)-hydrogenated polybutadiene-polystyrene (2)-hydrogenated polybutadiene A block copolymer before hydrogenation of the block copolymer having the above structure was synthesized by a conventional method.

The synthesized block copolymer was hydrogenated by a conventional method to obtain a hydrogenated block copolymer.

The characteristics of the hydrogenated block copolymer obtained will be described below.

The amount of bonded styrene: 32%

The total amount of the 1,2-vinyl bond amount and the 3,4-vinyl bond amount (total vinyl bond amount) of polybutadiene before hydrogenation: 36%

The degree of hydrogenation of the polybutadiene part: 99.9%

The number average molecular weight of the hydrogenated block copolymer: 65000

The number average molecular weight of the polystyrene (1): 9800

The number average molecular weight of the polystyrene (2): 9800

(c-5): A hydrogenated block copolymer having an A-B-A type structure of polystyrene (1)-hydrogenated polybutadiene-polystyrene (2)

A block copolymer before hydrogenation of the block copolymer having the above structure was synthesized by a conventional method.

The synthesized block copolymer was hydrogenated by a conventional method to obtain a hydrogenated block copolymer.

The characteristics of the hydrogenated block copolymer obtained will be described below.

The amount of bonded styrene: 67%

The total amount of the 1,2-vinyl bond amount and the 3,4-vinyl bond amount (total vinyl bond amount) of polybutadiene before hydrogenation: 41%

The degree of hydrogenation of the polybutadiene part: 99.9%

The number average molecular weight of the hydrogenated block copolymer: 49000

The number average molecular weight of the polystyrene (1): 16400

The number average molecular weight of the polystyrene (2): 16400

[Resin Composition]

The methods for measuring characteristics of resin compositions in Examples and Comparative Examples will be described below.

(Tensile Elongation, Rigidity (Flexural Modulus))

The resin pellets obtained in Examples and Comparative Examples were fed to a screw in-line type injection molding machine set to 240 to 280° C. to injection mold test pieces for measuring flexural modulus and tensile elongation at a mold temperature of 60° C., and the resulting test pieces were allowed to stand in an 80° C. environment for 24 hours using a gear oven to perform heat history treatment.

These molded articles were used for measuring tensile elongation and flexural modulus according to ISO 527 and ISO 178, respectively.

(Residence Heat Stability)

The pellets were put in a cylinder of a melt indexer set to 230° C., loaded with an extrusion rod, and allowed to stay for 4 minutes or 10 minutes in a heat-molten state.

The MFR was measured under a load of 2.16 kg after a predetermined residence time.

The difference between the MFR at a residence time of 4 minutes and the MFR at a residence time of 10 minutes was defined as ΔMFR, and it was evaluated that the smaller the ΔMFR was, the more excellent was the residence heat stability. The MFR was measured according to ISO 1133.

Examples 1 to 9, Comparative Examples 1 to 9

A twin screw extruder ZSK-25 (manufactured by Coperion GmbH) was used, in which there were provided, in the flow direction of raw materials, a first raw material feed port on the upstream side, a second raw material feed port downstream of the first raw material feed port, and a vacuum vent downstream of the second raw material feed port.

Further, the raw materials were fed to the second feed port using a forced side feeder from the opening on the extruder side.

Using the extruder which was set as described above, the above components (a) to (c) were blended according to the composition shown in following Table 1 and melt kneaded under the conditions of a barrel temperature of 200 to 230° C. in a zone where the component (a) melts and in a zone where the component (a) and the component (c) melt, a barrel temperature of 270 to 300° C. in a zone where the component (b) melts and in a zone where the component (a) and/or the component (c) melts, a screw rotation speed of 300 rpm, and a discharge rate of 15 kg/hour to obtain pellets.

Evaluation results are shown in following Table 1.

| | | | Example 1 | Example 2 | Example 3 | Example 4 | Example 5 | Example 6 | Example 7 | Example 8 | Example 9 |
|---|---|---|---|---|---|---|---|---|---|---|---|
| First raw material feed port | Component (a) | mass % | 85 | 85 | 85 | 85 | | 85 | 95 | 77.5 | 85 |
| | Component (b-1) | | | | | | 3 | | | | |
| | Component (b-2) | | | | | | | | | | |
| | Component (b-3) | | | | | | | | | | |
| | Component (c-1) | | | | | | 12 | | | | |
| | Component (c-2) | | | | | | | | | | |
| | Component (c-3) | | | | | | | | | | |
| | Component (c-4) | | | | | | | | | | |
| | Component (c-5) | | | | | | | | | | |
| Second raw material feed port | Component (a) | | | | | | 85 | | | | |
| | Component (b-1) | | 1.5 | 3 | 4.5 | 7.5 | | 3 | 1 | 4.5 | 9 |
| | Component (b-2) | | | | | | | | | | |
| | Component (b-3) | | | | | | | | | | |
| | Component (c-1) | | 13.5 | 12 | 10.5 | 7.5 | | | 4 | 18 | 6 |
| | Component (c-2) | | | | | | | 12 | | | |
| | Component (c-3) | | | | | | | | | | |
| | Component (c-4) | | | | | | | | | | |
| | Component (c-5) | | | | | | | | | | |
| Ratio (b)/(c) | | | 0.11 | 0.25 | 0.43 | 1.00 | 0.25 | 0.25 | 0.25 | 0.25 | 1.50 |
| Physical properties | Tensile | % | 38 | 53 | 53 | 55 | 51 | 40 | 72 | 30 | 54 |
| | Flexural modulus | MPa | 1660 | 1660 | 1740 | 1790 | 1640 | 1650 | 1450 | 1960 | 1810 |
| | Residence heat stability | | 0.7 | 0.2 | 0 | 0.4 | 0.1 | 0.3 | 0.8 | 0.1 | 0.5 |

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| First raw material feed port | Component (a) | mass % | 85 | 85 | 85 | 85 | 85 | 85 | 98 | 70 | 85 |
| | Component (b-1) | | | | | | | | | | |
| | Component (b-2) | | | | | | | | | | |
| | Component (b-3) | | | | | | | | | | |
| | Component (c-1) | | | | | | | | | | |
| | Component (c-2) | | | | | | | | | | |
| | Component (c-3) | | | | | | | | | | |
| | Component (c-4) | | | | | | | | | | |
| | Component (c-5) | | | | | | | | | | |
| Second raw material feed port | Component (a) | | 10.5 | 3 | 3 | 3 | | | 0.4 | 6 | 1 |
| | Component (b-1) | | | | | | 3 | | | | |
| | Component (b-2) | | | | | | | 3 | | | |
| | Component (b-3) | | 4.5 | | | | 12 | 12 | 1.6 | 24 | 14 |
| | Component (c-1) | | | | | | | | | | |
| | Component (c-2) | | | 12 | | | | | | | |
| | Component (c-3) | | | | 12 | | | | | | |
| | Component (c-4) | | | | | 12 | | | | | |
| | Component (c-5) | | 2.33 | 0.25 | 0.25 | 0.25 | 0.25 | 0.25 | 0.25 | 0.25 | 0.07 |
| Ratio (b)/(c) | | | 19 | 32 | 21 | 17 | 27 | 19 | 79 | 19 | 30 |
| Physical properties | Tensile | % | 1800 | 1640 | 1640 | 1660 | 1640 | 1640 | 1390 | 2110 | 1640 |
| | Flexural modulus | MPa | 0.7 | 1.0 | 0.7 | 0.8 | 0.1 | 0.1 | 1.3 | 0.1 | 1.1 |
| | Residence heat stability | | | | | | | | | | |

The ratio (b)/(c) represents (mass of polyphenylene ether)/(mass of hydrogenated block copolymer).

It was found that the resin compositions of Examples 1 to 9 are excellent in all of tensile elongation, rigidity, and residence heat stability and have good balance of characteristics from Table 1.

INDUSTRIAL APPLICABILITY

The resin composition and molded article of the present invention have industrial applicability as: automobile parts, specifically exterior parts such as a bumper, a fender, a door panel, a molding, an emblem, an engine hood, a wheel cover, a roof, and a spoiler, and interior parts such as an instrument panel and a console box trim; a cabinet and a chassis of various computers and peripheral devices thereof, other OA equipment, a television, a video, and various disk players; a refrigerator; an air-conditioner; a liquid crystal projector; an electric wire and cable obtained by covering a metallic conductor or an optical fiber; and the like.

What is claimed is:

1. A resin composition comprising:
   (a): 75 to 97% by mass of a polypropylene-based resin;
   (b): 1 to 15% by mass of a polyphenylene ether-based resin having a reduced viscosity ($\eta sp/c$) of 0.25 to 0.36 dL/g, measured as a 0.5 g/dL chloroform solution at 30° C.; and
   (c): 2 to 19% by mass of a hydrogenated block copolymer which is a hydrogenated product of a block copolymer comprising at least two polymer blocks A mainly comprising a vinyl aromatic compound and at least one polymer block B mainly comprising a conjugated diene compound, wherein
   the at least two polymer blocks A have a number average molecular weight (MncA) of 4,000 to less than 8,000, and
   a mass ratio ((b)/(c)) of the component (b) to the component (c) is 10/90 to 60/40, and
   a total amount of the conjugated diene compound bonded by a 1,2-vinyl bond or a 3,4-vinyl bond is 35 to 55 mol % based on the total conjugated diene compound in the component (c) in a bonding form of the conjugated diene compound in the polymer block B of the block copolymer before the component (c) is hydrogenated.

2. The resin composition according to claim 1, wherein the mass ratio ((b)/(c)) of the component (b) to the component (c) is 20/80 to 60/40.

3. The resin composition according to claim 1, wherein the total amount of conjugated diene compound bonded by a 1,2-vinyl bond or a 3,4-vinyl bond is 40 to 55 mol % based on the total conjugated diene compound in the component (c) in a bonding form of the conjugated diene compound in the polymer block B of the block copolymer before the component (c) is hydrogenated.

4. The resin composition according to claim 1, wherein the content of the vinyl aromatic compound in the component (c) is 12 to 30% by mass based on the total amount of the component (c).

5. The resin composition according to claim 1, wherein the component (c) has a number average molecular weight (Mnc) of 100,000 or less.

6. The resin composition according to claim 1, wherein the component (b) has a number average molecular weight (Mnb) of 7,000 to 15,000.

7. The resin composition according to claim 1, wherein the polypropylene-based resin (a) is a homo-polypropylene and/or a block-polypropylene and has a melt flow rate of 0.1 to 100 g/10 minutes as measured at 230° C. under a load of 2.16 kg according to ISO 1133.

8. The resin composition according to claim 2, wherein the polypropylene-based resin (a) is a homo-polypropylene and/or a block-polypropylene and has a melt flow rate of 0.1 to 100 g/10 minutes as measured at 230° C. under a load of 2.16 kg according to ISO 1133.

9. A molded article comprising the resin composition according to claim 1.

\* \* \* \* \*